US010129955B2

(12) United States Patent
Rogers et al.

(10) Patent No.: US 10,129,955 B2
(45) Date of Patent: Nov. 13, 2018

(54) LIGHT SOURCE IDENTIFICATION APPARATUS AND METHOD

(71) Applicant: Sony Interactive Entertainment Inc., Tokyo (JP)

(72) Inventors: Phillip Rogers, London (GB); Jesus Lucas Barcias, London (GB)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/363,623

(22) Filed: Nov. 29, 2016

(65) Prior Publication Data
US 2017/0164447 A1    Jun. 8, 2017

(30) Foreign Application Priority Data
Dec. 3, 2015 (GB) .................................. 1521374.7

(51) Int. Cl.
*H05B 37/02* (2006.01)
*H04N 5/225* (2006.01)
*G06T 7/00* (2017.01)
*H04N 5/232* (2006.01)

(52) U.S. Cl.
CPC ....... *H05B 37/0227* (2013.01); *G06T 7/0018* (2013.01); *H04N 5/2256* (2013.01); *H04N 5/23238* (2013.01)

(58) Field of Classification Search
CPC ............ H05B 37/0272; H05B 37/0218; H05B 37/0227; H05B 37/029; H05B 37/02; H05B 33/0857; H05B 33/0869; H05B 33/0863; H05B 33/0866; F21Y 2115/10; G06T 7/74
See application file for complete search history.

(56) References Cited

U.S. PATENT DOCUMENTS

| 2011/0227915 | A1 | 9/2011 | Mandella |
| 2012/0105473 | A1 | 5/2012 | Bar-Zeev |
| 2012/0162633 | A1* | 6/2012 | Roberts ..................... G01S 5/16 356/5.09 |
| 2012/0249480 | A1 | 10/2012 | Keenan |
| 2013/0120252 | A1 | 5/2013 | Lam |
| 2014/0132827 | A1 | 5/2014 | Imai |

(Continued)

FOREIGN PATENT DOCUMENTS

WO    2015148701 A1    10/2015

OTHER PUBLICATIONS

European Search Report for corresponding EP Patent application No. 16198572, 8 pages, dated Feb. 7, 2017.

(Continued)

*Primary Examiner* — Tung X Le
*Assistant Examiner* — Borna Alaeddini
(74) *Attorney, Agent, or Firm* — Matthew B. Dernier, Esq.

(57) ABSTRACT

A light source identification system, the system comprising a light source imaging device and a processing device, the light source imaging device comprising a light sensor operable to image at least a portion of an environment in which the light source imaging device is present, wherein the environment comprises one or more light sources, and a transmitter operable to transmit image data, and the processing device comprising a processor that is operable, in a calibration mode, to identify light sources from received image data and locate them within the environment.

12 Claims, 4 Drawing Sheets

(56) References Cited

U.S. PATENT DOCUMENTS

| | | |
|---|---|---|
| 2015/0076992 A1 | 3/2015 | Walma |
| 2015/0147067 A1 | 5/2015 | Ryan |
| 2015/0230320 A1* | 8/2015 | Gritti ................. H05B 37/0245 340/12.3 |
| 2015/0282282 A1* | 10/2015 | Breuer ............... H05B 37/0272 315/152 |
| 2017/0064169 A1* | 3/2017 | Mishra ................ H04N 5/2354 |
| 2017/0105265 A1* | 4/2017 | Sadwick .............. A61N 5/0618 |
| 2017/0171941 A1* | 6/2017 | Steiner ............... H05B 37/0254 |
| 2017/0238401 A1* | 8/2017 | Sadwick ............ H05B 37/0281 315/294 |
| 2017/0265272 A1* | 9/2017 | Shan ................. H05B 37/0218 |
| 2017/0265277 A1* | 9/2017 | Nolan ............... H05B 37/0227 |
| 2017/0280068 A1* | 9/2017 | Shin ....................... H04N 5/332 |

OTHER PUBLICATIONS

Search Report for corresponding GB application No. 1521374.7, 6 pages, dated Mar. 24, 2016.

\* cited by examiner

LIGHT SOURCE IDENTIFICATION APPARATUS AND METHOD

BACKGROUND OF THE INVENTION

Field of the Invention

This disclosure relates to a light source identification apparatus and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

It is often considered that an increase in the level of immersion provided to a user of a display device is desirable, for example in the context of viewing a movie or playing a video game, as is evidenced by the growing interest in head-mountable display (HMD) devices. The level of immersion of a display arrangement may be increased by reducing the effects of environmental factors or increasing the perceived size of the display for example; in the context of an HMD device this is achieved by locating a display close to the wearer's eyes in a manner in which the external environment is not viewable. Noise-reducing or noise-cancelling headphones may also be provided, so as to reduce the effects of external audio stimuli.

While HMD devices appear to provide a solution to the problem of obtaining a high level of immersion when using a display unit, there is still a desire to provide these same advantages in other arrangements, such as those comprising televisions as the display device.

When using a television as a display device, blocking out external stimuli such as lights and sounds becomes impractical; especially when the television is being used by multiple people simultaneously. This problem may be compounded by the fact that many users will have a variety of light sources in their home, many of which will be arranged in the same room as the television. Many of these light sources may be embedded with circuitry so as to allow network connectivity (either wired or wireless), which allow the light sources to communicate with other devices as part of a so-called 'Internet of Things'.

It is an aim of this disclosure to address the problem of external light sources (namely those that are not directly associated with the display device) reducing the level of immersion experienced by a user.

SUMMARY OF THE INVENTION

In a first aspect, a light source identification system is provided in accordance with claim 1.

In another aspect, a light source identification method is provided in accordance with claim 13.

Further respective aspects and features of the disclosure are defined in the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
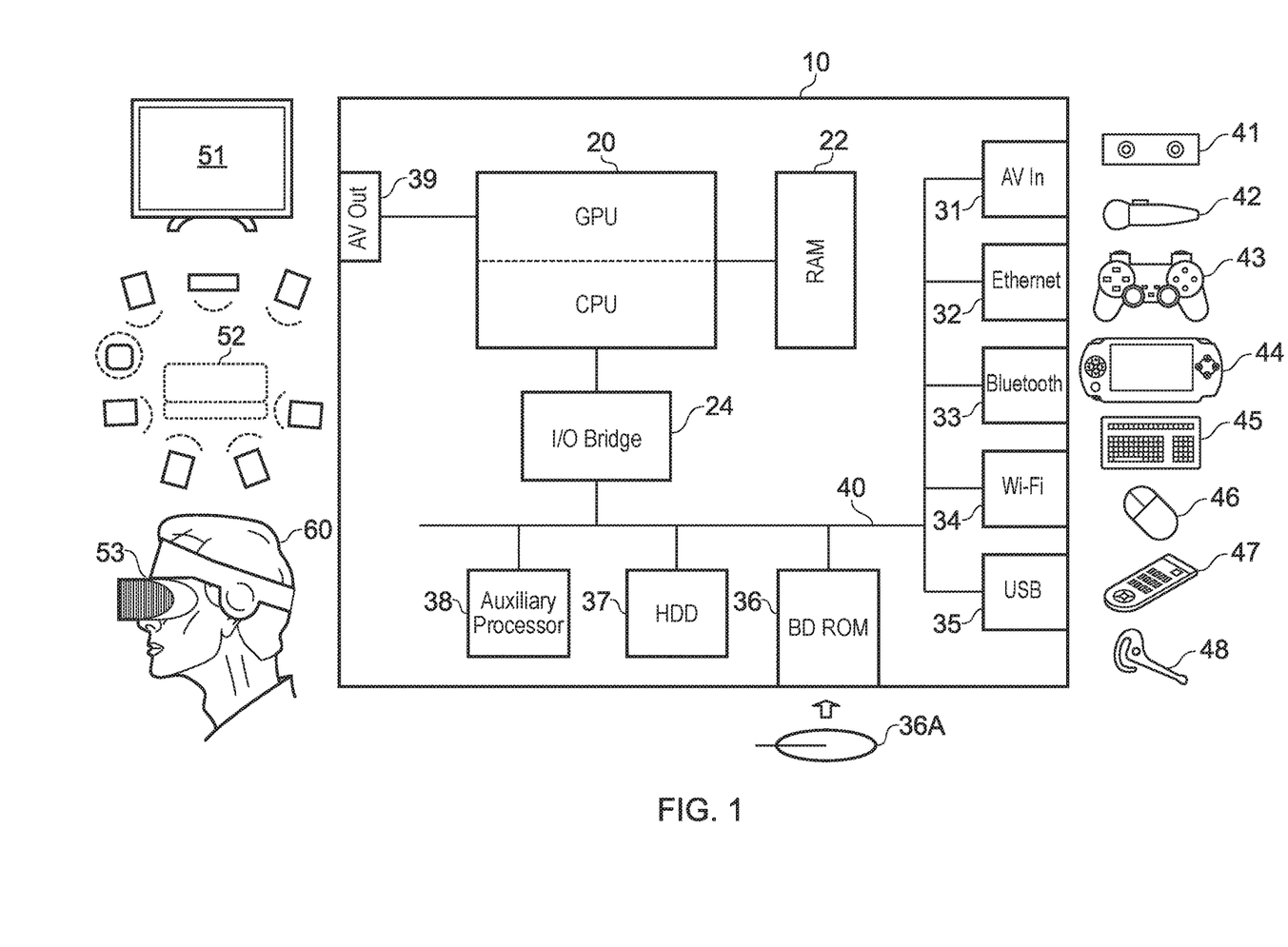
FIG. 1 schematically illustrates an entertainment device.

Referring now to the drawings, wherein like reference numerals designate identical or corresponding parts throughout the several views, FIG. 1 schematically illustrates the overall system architecture of a Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as Orbis OS®, a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

Figure 2:
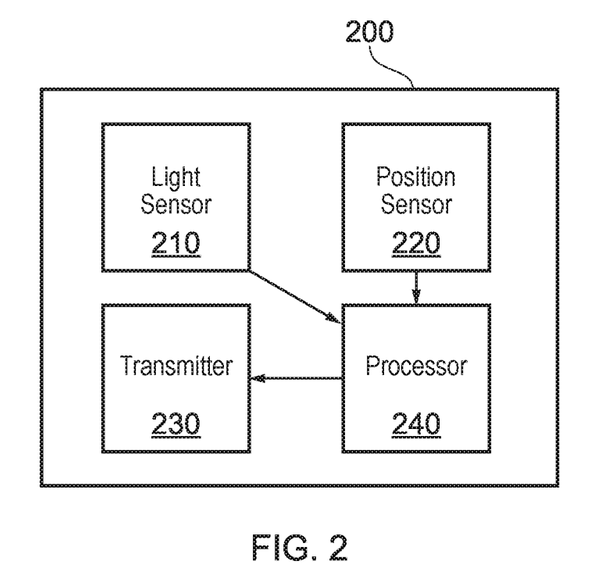
FIG. 2 schematically illustrates a light sensing device.

FIG. 2 schematically illustrates a light sensing apparatus 200. In conjunction with a processing device such as the entertainment device 10, these form a light source identification system. The light sensing apparatus 200 comprises a light sensor 210, position sensor 220, transmitter 230 and processor 240. The light sensor 210 is a component such as a CMOS or CCD image sensor that is sensitive to light. This sensor may be directional, such that it is arranged to only capture images in a particular direction, or substantially non-directional such that a much larger portion of the environment may be imaged. A pair of sensors could be provided so as to function as a stereoscopic pair of imaging devices, allowing a depth value to be calculated for features that appear in each of a pair of images captured by the sensors of the same portion of the environment.

In a calibration mode of the light source identification system, the position sensor 220 may be used to provide information relating to the location or orientation of the light sensing apparatus 200. This information may be combined with information about the specifications of the light sensor 210 in order to determine the portion of the environment that appears within the field of view of a captured image. The transmitter 230 is operable to transmit image data (and any other information) to an external device such as the entertainment device, for example through a wireless network connection or via an internet connection. A processor 240 is also provided in the light sensing apparatus 200, which may perform processing such as to associate any appropriate metadata with the image data that is to be transmitted to an external device. An example of such metadata is position information, as obtained by the position sensor 220.

In order to generate a map of light features in an environment, it is preferable to capture images of a substantial portion of the environment in which the light sensing apparatus 200 is present. One option is for a user to be instructed to move the light sensing apparatus 200 so that images are captured of a greater proportion of the environment. The user could be instructed to move the light sensing apparatus 200 in a predetermined motion to aid mapping of the environment, or information from the position sensor 220 could be used in place of this. A motorised device could be provided upon which the light sensing apparatus 200 is mounted, so as to reduce the need for the user to manually move the light sensing apparatus 200. This further automates the image capture process by allowing the motion of the light sensing apparatus 200 to be controlled by computer-determined inputs that instruct the motorised device to move in a specified manner rather than having to compute a path taken by the light sensing apparatus 200 as it is moved by a human hand.

Figure 3:
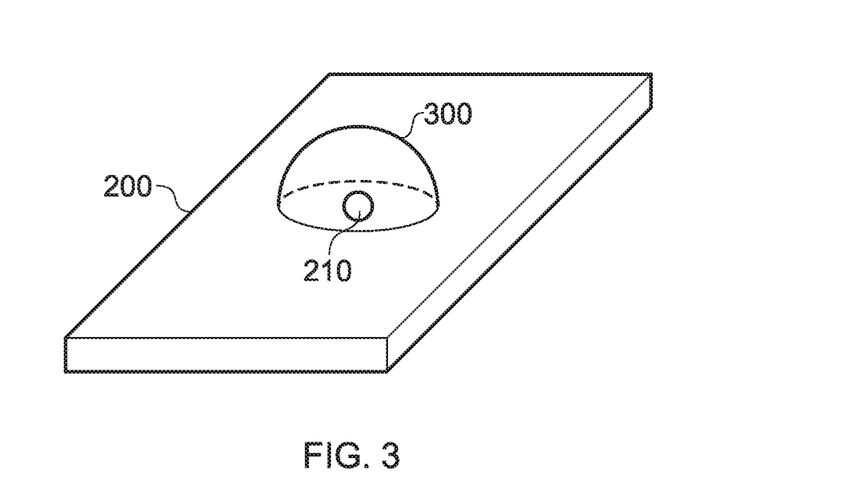
FIG. 3 schematically illustrates a light sensing device provided with a lens.

An alternative to this arrangement is schematically illustrated in FIG. 3. In this Figure, the light sensing apparatus 200 is provided with a lens 300 arranged over the light sensor 210. The lens 300 may be a wide-angle lens, such as a fish-eye lens, that gives the light sensor 210 a larger field of view relative to the same sensor without a wide-angle lens. A similar effect could also be achieved by providing the light sensor 210 with an arrangement of prisms which may redirect incident light in such a way that light from a larger portion of the environment may be captured. This may allow the light sensor 210 to image a sufficient portion of the environment without requiring the light sensing apparatus 200 to be moved or reoriented, or it may at least reduce the number of times that movement or reorientation is required. Such a lens will cause a distorted image to be captured, and therefore the processor 240 may be configured to perform image processing to compensate for this distortion. Alternatively, image processing may be performed by an external device after the image has been transmitted by the light sensing apparatus 200.

A lens arrangement may also be provided that is configured to direct incident light to the light sensor 210. Such an arrangement is mounted upon the light sensing apparatus 200 so as to be able to direct incoming light towards the light sensor 210. This arrangement may comprise a motor, such that it can be reoriented in response to received instructions, or it may be reoriented manually by a user.

Figure 4:
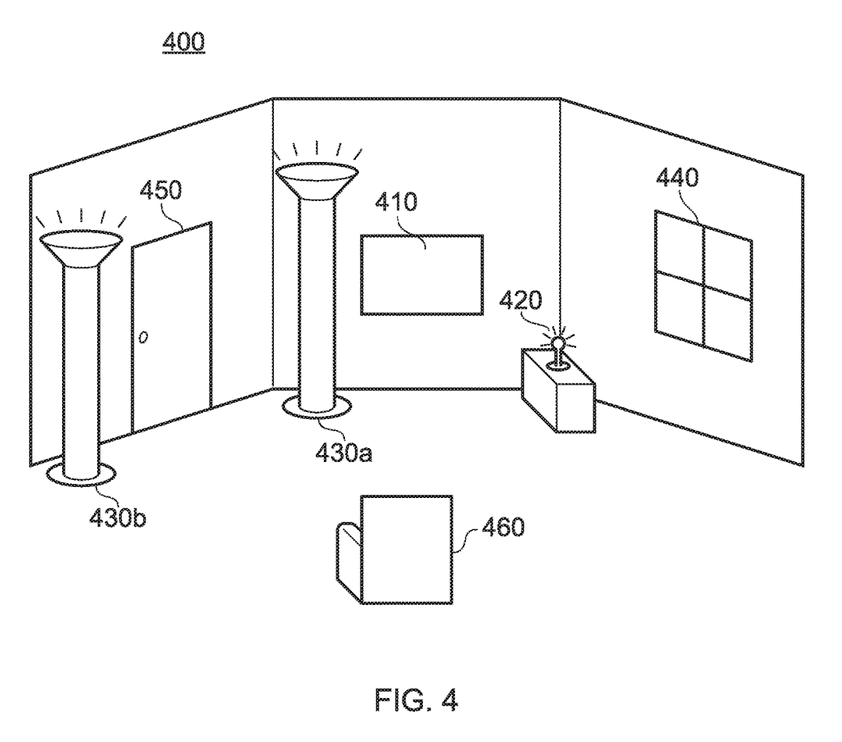
FIG. 4 schematically illustrates an environment in which light sources are to be mapped.

FIG. 4 schematically illustrates a cut-away view of a room 400 which serves as the environment in which the light sources are to be mapped. A map describing the shape and size of the room may be provided manually by a user, or images of the room may be supplied to a processing device in order to generate a map of the room automatically. As a further alternative, a SLAM (Simultaneous Localisation And Mapping) method could be implemented in order to generate a map of the environment as well as locating the camera in the environment.

The room 400 comprises a display device 410, such as a television, and a number of light sources 420, 430, 440 and 450 that shall be described below. The user of the display device is generally located in the seat 460, and in embodiments of this arrangement the light sensing apparatus 200 may be located at the same position as the user (for example, a handheld device such as a mobile phone) or it may be in a fixed position, such as being associated with the display 410 or an entertainment device (not pictured). In some embodiments, such as that exemplified by FIG. 4, a plurality of light sources is provided. However, it should be noted that only a single light source need be provided for the currently described arrangement to be effective.

The light source 420 is an example of a non-directional light source that emits light in a broad range of directions, such as a lamp with no lampshade to restrict the direction in which light is emitted. Light sources 430 are examples of directional light sources, in this case what are known as uplighters. These sources will generally be arranged so as to only provide light to the user indirectly; due to the obstruction around the light bulb, light is only able to reach the user via reflection from a surface such as the wall or ceiling of the room. As a result, the lighting provided by the sources 430 will be regarded by the user as being softer that a direct source such as the light source 420. The window 440 is an example of a non-constant light source, as the time of day will cause variations in the brightness and colour of the light entering the room through the window due to the relative motion of the sun throughout the day/night cycle. The door 450 is an example of a possible source of light; if the door is left open, and a light is on in another room, light may be seen by the user.

Once the light sensing apparatus has been used to capture images of the environment, processing to locate light sources is performed. The location of the light sources may be derived directly from the images, for example by identifying image regions with a high brightness. Feature recognition could also be used, for example to identify distinctive patterns that result from the light emission by different light sources; an uplighter is often associated with a circular pattern of light on the ceiling, for example, and by identifying this feature it may be possible to better locate the light sources as (especially in the case of indirect light sources) it may not be the case that the brightest portions of an image correspond directly to the source of the light. Alternatively, a user may be able to manually identify light sources in an image provided by a display associated with the processing device. Any of these methods could be used in conjunction with a predetermined output from the display 410 that may be used to calibrate the apparatus.

Light sources that may communicate with the processing device may be identified from a plurality of images of the same portion of the environment captured by the light sensing apparatus. Each of these images is captured at a different time, and therefore if control is performed so as to cause the light sources to be switched on or off for each image the light sources may be identified in the images by comparing the time that the image was taken with the time that instructions were provided to the light sources by the processing device.

In order to assist with locating the light sources that are imaged, the processing device may be operable to cause an associated display device to display a reference image. For example, the display 410 associated with the processing device could be configured to display a pattern that can be used to identify the display easily in the captured images, and this may also assist in determining a scale of the images in addition to being useful for locating identified light sources relative to the display.

In addition to identifying the location of the light sources, the light sources may also be characterised by type of source such as those described above. The type of source may be provided by a user after the sources have been located in an image, or alternatively image processing methods may be used to determine the type of source. For example, lights with distinctive output light patterns could be identified by image analysis, and a window could be reliably identified by its size and shape as this is uncommon amongst light sources that comprise bulbs. Further methods for categorising light sources could be spectral analysis, as sunlight will provide a different spectrum to light emitting by a bulb, or by polling smart devices using a network connection in order to detect the type of light source for example.

Both the location and the type of light source are important in generating a light source map of the environment as each of these factors has an impact on the lighting in the environment as perceived by the user. By building a light source map of the environment that incorporates information about each of these it becomes possible to provide varying lighting conditions to a user in which control of the light sources is dependent on their arrangement about the environment and the type of light source which is provided.

When viewing a film or playing a game via a display, for example, it may be desirable to modify the lighting conditions of the room in which the user of the display is situated. Accordingly, in a control mode of the light source identification system, by using information about the lighting characteristics of the room, as well as knowing which light sources may have their output modified remotely and which can not, an effective management of the light sources can be provided. The modification of light source output could be implemented in response to instructions provided by the game or by metadata associated with the displayed film for example, or instructions could be generated based upon image processing of the display or based upon other provided data. Examples of such data could be data that indicates a mood or indication of an appropriate light level or other configuration of the light sources.

In one example scenario, it is desired that the area around the display 410 is not illuminated so well as other areas of the room 400, such as behind the user. Such a desired distribution of illumination may be termed a 'target distribution', and it will be appreciated that numerous target distributions are possible, and the selection of a particular target distribution may depend upon user preference, time of day, and/or the content being watched or played on a display in the room. Returning to the example target distribution above, in order to affect this, the light sources 420 and 430*a* should be reduced in brightness and the light source 430*b* may be increased in brightness to further highlight the difference in brightness between the area around the display and the remainder of the room. The light source 420 may be reduced in brightness more than the light source 430*a* due to the fact that the user is able to receive light from the source 420 directly; there is no scattering of the direct light from the walls/ceiling as with the light source 430.

In the example scenario provided above, the effect of the window 440 was not considered. However, often the window 440 will have an impact on the illumination in the room, as described above. In the example, if the window 440 were allowing light into the room this would have a detrimental effect on the attempts at generating the target distribution of illumination in the environment; it is unlikely that the window 440 would be providing an amount of light that perfectly matches that which would be desired. In this case, the light sources 420, 430*a* and 430*b* may each have their brightness reduced so as to compensate for the increase in brightness in the environment caused by the window 440, in order to reduce the error between the target distribution of illumination and the actual distribution. Alternatively, if the light entering the room 400 through the window 440 is directed towards the front of the room 400 the light sources 420 and 430*a* may be switched off entirely to reduce the error; alternatively, the light source 430*b* could be made even brighter so as to try and maintain a difference in brightness between the different areas of the room 400; in this case, for example, the error may be calculated with respect to a relative lighting distribution rather than an absolute lighting level; furthermore, a switch between an absolute and relative error measure may be triggered if a maximum or minimum change in controllable lighting does not meet a threshold error between the target and actual lighting distributions. In each case, the error may for example be based on an estimate of the brightness distribution obtained by processing an image captured from the camera 41 associated with the Sony® PlayStation 4® system unit 10, and/or may be based on models of expected lighting behaviour, as explained later herein. These are examples of generating instructions to change the operating state of a light source so as to compensate for the light output of light sources that may not be instructed by the processing device.

As noted above, light sources such as the window 440 (unless fitted with blinds that may be operated remotely) are generally beyond the control of the device that generates lighting modification instructions and as such their effect on the lighting in the environment may be accounted for instead of modified, by modelling their lighting behaviour. For example, the contribution to the lighting of the environment by the window 440 may be measured at several times and a model generated from this as to the time dependency of the light contribution; this means that an estimation of the brightness of the light coming in through the window may be generated without requiring a new measurement (or imaging from the camera 41) each time the light source model is used. Alternatively profiles could be provided for day- and night-time use in which windows have a binary pair of values (or other set of values) corresponding to light during the day and darkness at night. If it is anticipated that the window 440 is a source of bright light, the light sources 420 and 430*a* may be configured to output less light than they would if the window were not letting in any light in order to account for this.

The use of profiles to describe different times could be facilitated or assisted by using a camera associated with the processing device, such as the camera 41 associated with the Sony® PlayStation 4® system unit 10. This could be implemented by using the camera to capture images of the environment comprising the light sources and performing image analysis to determine an overall illumination of the room; this could be used in combination with information about which light sources are currently in use in order to determine whether the illumination level does correspond to day or night. Information about which light sources are currently in use could be obtained either via a network (in the case of light sources that are able to communicate with the processing device) or from images obtained by this camera for example. Images captured by the camera may be able to identify, from illumination levels or patterns, which light sources are currently in use.

Such a camera could also be used to detect a change in lighting conditions resulting from a new light source in the environment, and as a result of such a detection processing could be performed to compensate for this new light source or the user could be prompted to begin the light source mapping process again or otherwise update the light source map. A new light source may be an actual newly installed light, or may be an existing light that is not controllable by the system that is turned from off to on (for example by the user) thereby changing the lighting distribution in the room without otherwise informing the system; it will be appreciated that the system may then have to reconfigure the output of controllable light sources to reduce the error in a target distribution; alternatively, the system may interpret a manual change in lighting as an indication that the target distribution is no longer desired by the user, and therefore not reconfigure the output of controllable light sources. Which response is used may be a designer choice or user setting.

It will be appreciated that, to the extent that the light source identification system monitors the current light distribution in the room/environment, for example using the camera 41, the system may operate in both a control mode and a calibration mode (for example, in a re-calibration or monitoring sub-mode based on inputs from the camera 41 rather than the light source imaging device 200) simultaneously or in succession during normal operation.

The camera could also be used to characterise the light output of any newly-discovered light sources, for example their brightness, in the case that they are not light sources that can be controlled by the processing device. Information gathered in this way could be used to reduce the need to generate an entirely new light source map, as the information may be added to an existing map if appropriate.

Additionally, processing could be performed to try and discover the new light source via a network connection if it is determined that the light source may be a device that is a part of the Internet of Things. Any of the processing described may be dependent on a threshold variation in brightness of at least a portion of the environment being detected.

It is envisaged that the light emitted by the light sources could be modified in other ways than brightness. For example, the colour of the light that is emitted could be changed or a strobe pattern could be implemented by the light source. Additionally, the light emitted by the display 410 could also be changed; it may be desirable to change the brightness or alter the colours or colour balance displayed to compensate for the lighting characteristics of the environment, in order to provide a better viewing experience to the viewer.

Figure 5:
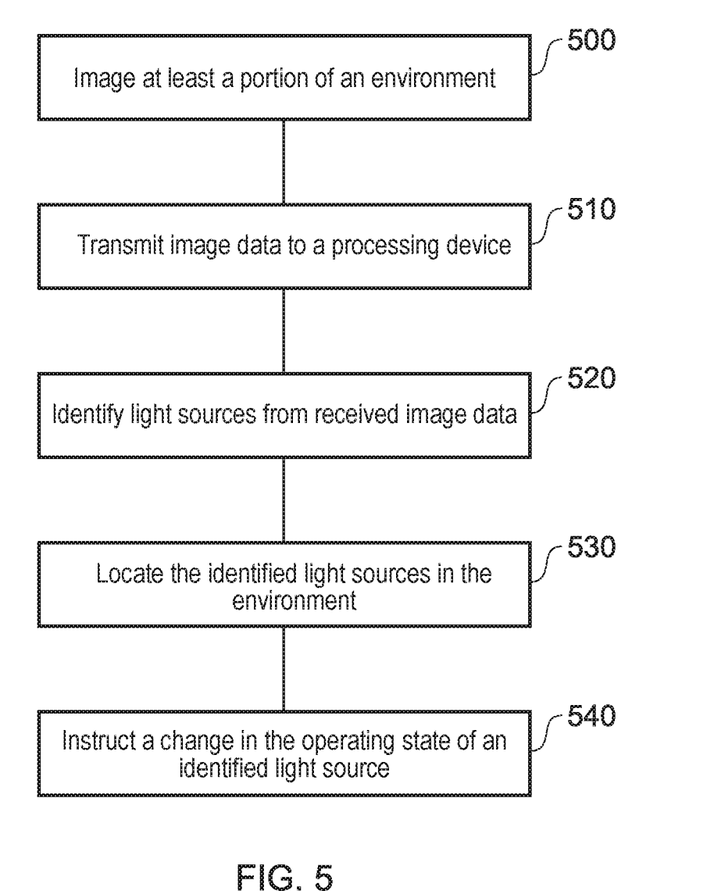
FIG. 5 schematically illustrates a light source identification method.

FIG. 5 schematically illustrates a light source identification method.

At a step 500, the light sensing apparatus is controlled so as to image at least a portion of the environment in which it is located, the environment comprising a number of light sources. At a step 510 image data, resulting from the imaging of the environment by the light sensing apparatus, is transmitted to a processing device. This transmission of data could be via a local wired or wireless network or via any other data transmission method, such as a USB connection or Bluetooth® connection between the light sensing apparatus and the processing device.

At a step 520 processing is performed so as to identify light sources from the received image data. As described above, this could take the form of detection of brighter areas in the image data and relating this to light sources or any other appropriate method. Once light sources have been identified, in a step 530 processing is performed to locate the identified light sources in the environment. This could be performed in conjunction with generating a map of the environment that locates the identified light sources within the environment.

At a step 540 the processing device instructs a change in the operating state of an identified light source. The processing device sends instructions, or information that may be interpreted to generate instructions, to at least one light source that cause the light source to alter its operation. This could be reflected in a change in the brightness of the light source, the colour of light that is emitted, or any other property of the light source or emitted light.

It may be desirable for users to be able to define a number of parameters or preferences to affect the modification of light sources. An example of this is a minimum, or floor, lighting level below which the illumination provided by the light sources will not be modified. This is particularly useful when a room is being used by multiple parties; as if the lighting level were to be too low then the other parties may be impeded in their activities. In addition to this, a user could define an average lighting level about which the adjustment of the illumination is performed. In addition to this, or as well as this, a user could define a particular base or default illumination of the room; this could relate to either (or both) the overall brightness or the particular configuration of each light source, for example.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A light source identification system, the system comprising:
   a light source imaging device, comprising:
      a light sensor operable to image at least a portion of an environment in which the light source imaging device is present, wherein the environment comprises one or more light sources, and
      a transmitter operable to transmit image data; and,
   a processing device, comprising:
      a processor that is operable, in a calibration mode, to identify light sources from received image data and locate them within the environment, and to generate a model of the light output of the identified light sources, wherein the model comprises a time-dependent light contribution of a source obtained by measuring a contribution by the source to the lighting of the environment at a plurality of times.

2. A system according to claim 1, wherein the processing device controller is operable, in a control mode, to instruct a change in the operating state of an identified light source.

3. A system according to claim 2, wherein instructions to change the operating state of a light source are generated so as to compensate for the light output of light sources that may not be instructed by the processing device.

4. A system according to claim 2, wherein instructions are generated so as to maintain an illumination level above a predefined threshold value.

5. A system according to claim 1, wherein the processor is operable to generate a map of the environment that locates the identified light sources within the environment.

6. A system according to claim 1, wherein the light sensor is provided with a wide-angle lens.

7. A system according to claim 1, wherein the light sensor is provided with a motor-driven lens arrangement.

8. A system according to claim 1, wherein the processing device is operable to cause an associated display device to display a reference image.

9. A system according to claim 1, wherein an imaging device associated with the processing device is configured to monitor the illumination of the environment, and when the illumination is detected to vary by greater than a threshold amount the light sensor is operable to re-image at least a portion of the environment.

10. A light source identification method, the method comprising:
    imaging at least a portion of an environment, wherein the environment comprises one or more light sources;
    transmitting image data to a processing device;
    identifying light sources from received image data; and
    in a calibration mode, locating the identified light sources in the environment, and to generate a model of the light output of the identified light sources, wherein the model comprises a time-dependent light contribution of a source obtained by measuring a contribution by the source to the lighting of the environment at a plurality of times.

11. A light source identification method according to claim 10, comprising the step of:
    in a control mode, instructing a change in the operating state of an identified light source.

12. A non-transitory machine-readable storage medium which stores a computer program that, when implemented by a computer, causes the computer to perform a method comprising the steps of:
    imaging at least a portion of an environment, wherein the environment comprises one or more light sources;
    transmitting image data to a processing device;
    identifying light sources from received image data; and
    in a calibration mode, locating the identified light sources in the environment, and to generate a model of the light output of the identified light sources, wherein the model comprises a time-dependent light contribution of a source obtained by measuring a contribution by the source to the lighting of the environment at a plurality of times.

* * * * *